United States Patent [19]

Douglas et al.

[11] Patent Number: 4,471,442
[45] Date of Patent: Sep. 11, 1984

[54] MODULAR ELECTRONIC MEASURING AND PRINTING UNIT

[75] Inventors: Alec T. Douglas; James S. Havers, both of St. Johnsbury, Vt.

[73] Assignee: Colt Industries Operating Corp., New York, N.Y.

[21] Appl. No.: 482,548

[22] Filed: Apr. 6, 1983

Related U.S. Application Data

[62] Division of Ser. No. 174,279, Jul. 31, 1980, Pat. No. 4,393,455.

[51] Int. Cl.³ .................. B41J 3/12; G06K 15/10
[52] U.S. Cl. .................. 364/466; 364/519; 364/900; 400/708
[58] Field of Search ........... 364/466, 519, 200, 900; 101/93.04, 93.05; 400/121, 124, 708; D14/100, 105, 107, 114, 115

[56] References Cited

U.S. PATENT DOCUMENTS

| D. 255,121 | 5/1980 | Roch | D14/115 |
| D. 268,029 | 2/1983 | Fisher | D14/107 |
| 4,028,538 | 6/1977 | Olander, Jr. et al. | 364/900 |
| 4,181,946 | 1/1980 | Loshbough et al. | 364/466 |
| 4,219,089 | 8/1980 | Gard et al. | 364/567 |
| 4,229,794 | 10/1980 | Foster | 364/466 |
| 4,379,336 | 4/1983 | Yamamoto et al. | 364/708 |

FOREIGN PATENT DOCUMENTS

| 52-4118 | 1/1977 | Japan | 364/708 |

OTHER PUBLICATIONS

Mettler Instrument Corporation PC 4400 Publication, May 1980.
Mu Pro Inc. Publication—Modular u Pro-80 Subassemblies and Circuit Cards, Feb. 1977.
Toledo Scale—Automate Modular System, Jun. 1979 Publication, p. 9.
Ignoffo et al.: Managing Dot-Matrix Printing with a Microprocessor, Hewlett-Packard T., vol. 29, No. 15, Nov. 1978, p. 8/19

*Primary Examiner*—Felix D. Gruber
*Attorney, Agent, or Firm*—Sixbey, Friedman & Leedom

[57] ABSTRACT

A compact, modular, electronic measuring unit (10) constructed for enclosure within a small, portable housing (12) having a removable front wall (40) to provide access to the enclosure (28) formed within the housing (12). A measuring and indicator circuit card (60) is mounted within the enclosure (28) adjacent the front wall (40) while a power circuit card (58) is mounted within the enclosure adjacent the rear wall (22) thereof. Manual control units (44, 52, 54) are mounted on the front wall (40) of the housing (12) and are removable therewith.

A moving dot matrix printer (56) is mounted within the housing (12) and is connected to receive data from the measuring and indicator circuit (60). This printer (56) is activated by one of the control units (50) on the front wall (40) of the housing (12), and includes a printer unit (116) which is driven in a first plane during the printing of a character on a record medium (178) and a record medium drive unit (136, 148, 150) which drives a record medium (178) in a second plane transverse to the first plane during the printing of a character.

28 Claims, 12 Drawing Figures

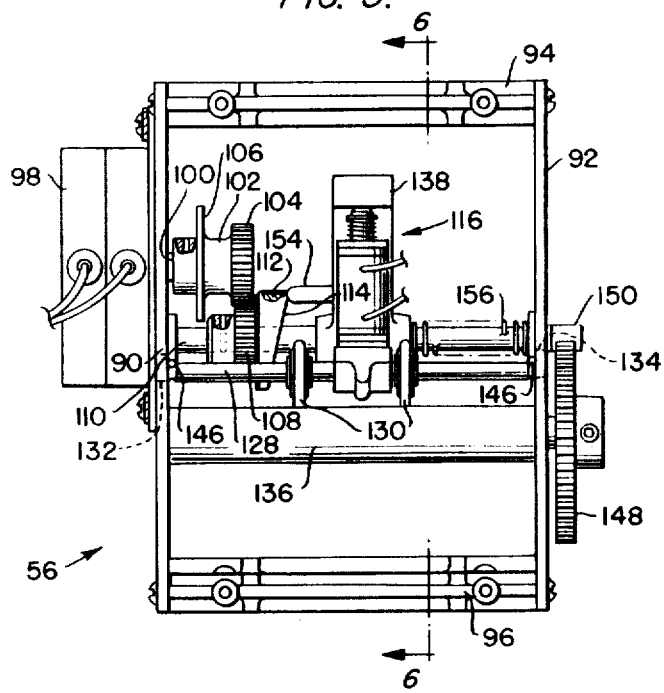
FIG. 5.
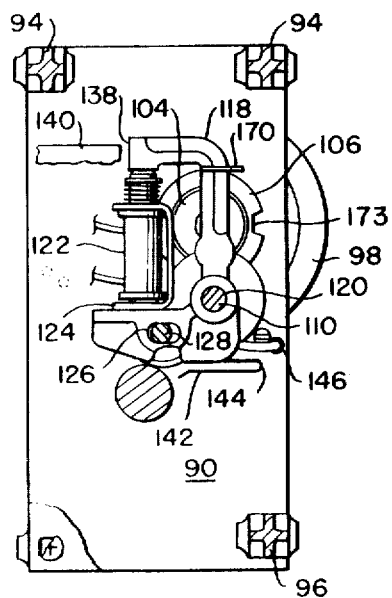
FIG. 6.
FIG. 7.

MODULAR ELECTRONIC MEASURING AND PRINTING UNIT

This application is a division of application Ser. No. 174,279, filed July 31, 1980 and now U.S. Pat. No. 4,393,455.

DESCRIPTION

1. Technical Field

The present invention relates generally to electronic measuring units capable of providing a digital indication representative of a value to be measured while simultaneously providing a printed representation of such digital indication upon a record form.

2. Background Art

Recent advances in electronic technology which have made available low cost but efficient microprocessor systems have led to the development of improved electronic measuring systems capable of providing a digital indication representative of a value to be measured. These microprocessor controlled systems, such as that disclosed by U.S. Pat. No. 3,926,570 to Loshbough, provide automatic zeroing, zero set functions, tare control, and many other functions previously provided by much more complex logic circuits, such as that disclosed by U.S. Pat. No. 3,665,169 to Henderson et al. Additionally, microprocessor measuring systems may be programmed to provide a number of calibration functions and other program control functions which previously have been performed by excessively expensive, large and complex electronic units.

Although microprocessor technology has resulted in the development of electronic measuring systems having greatly enhanced capabilities, such systems are generally still of substantial size, expensive, and difficult to service. This is particularly true when the measuring system is combined with both a visual digital indicator and a printer assembly for providing a record printout of the visual display. Combined electronic measuring and printer systems, such as those used for electronic weighing, are generally both large and complex, as illustrated by U.S. Pat. Nos. 3,623,119, to Orr and 3,701,991 to Livesey. Consequently, there is a demand for a small, compact, modular electronic measuring unit and printer system which may be operated from either a battery or a conventional power supply and which, although adapted to a wide variety of uses, may be easily and inexpensively serviced and repaired.

DISCLOSURE OF THE INVENTION

It is the primary object of the present invention to provide a low cost, compact, modular electronic measuring and printing unit which is of simple construction and which may be easily serviced in the field. This unit is constructed for enclosure within a small, portable housing having at least one removable wall to provide access to the enclosure within the housing. The electronic system for the unit is modular with a power supply system being mounted upon a circuit card adjacent the rear of the housing and the electronic circuitry for the measuring unit being mounted with an indicator system therefor on a circuit card adjacent the front wall of the housing. The front wall of the housing includes a window to facilitate visual observation of the indicator.

The present invention further provides a modular, portable electronic measuring unit mounted within a housing having a removable front wall section to provide access to the enclosure within the housing. The measuring system includes a power supply circuit provided upon a removable circuit card adjacent the rear of the housing and a measuring and indicator circuit provided upon a removable circuit card adjacent the front wall of the housing. The front wall of the housing carries mechanical control members removable with the front wall which cooperate with the measuring circuit card to control the operation of the measuring circuit when the front wall section is in place on the housing. This unit is designed to provide convenient access to the measuring circuit card so that simple calibration adjustment is facilitated.

Another aspect of the present invention is to provide a novel and improved modular, portable electronic measuring unit and printer system which is conveniently mounted within a small portable compact housing. The power supply circuit for the both the printer and the measuring system is mounted upon a single circuit card adjacent the rear wall of the housing, while the measuring circuit and control circuit for the printer system is mounted upon a single circuit card adjacent the front wall of the housing. This front circuit card also bears an indicator unit for the measuring system which provides a visual indication through a window in the front wall of the housing. Control actuators for both the measuring systm and the printer are provided by elements mounted on the housing front wall and removable from the housing with the front wall.

It is another object of the present invention to provide a moving dot matrix printer for use with an electronic measuring system which operates to print alpha or numeric characters on a single or multiple copy pre-printed ticket form. The ticket form is inserted under a dot marker until a stop is engaged, wherein the ticket form will then be automatically fed out of the printer as printing occurs. The printer timing and character generation are controlled by a microprocessor with the characters being formed by a matrix of dots to a pattern stored in a non-volatile memory.

A further aspect of the present invention is to provide a moving dot matrix printer for use with an electronic measuring system having a print unit which is mounted for movement in a first plane and a print drive assembly to selectively move the print unit between spaced points in the first plane. The print unit marks an adjacent record medium and a record medium drive unit is provided to move the record medium in a second plane transverse to the first plane.

Another aspect of the present invention is to provide a moving dot matrix printer for use with an electronic measuring system wherein the printer forms alpha or numeric characters on a record medium by inscribing dots on the record medium at selected positions along spaced rows of a dot matrix. During printing, a printer unit is moved in a first plane and the record medium is moved in a second plane transverse to said first plane to form said spaced rows.

A further object of the present invention is to provide a modular, electronic measuring and printing unit wherein a single microprocessor chip is employed to control analog to digital conversion, arithmetic and display functions as well as the operation of a printer unit.

A still further object of the invention is to provide a modular electronic measuring and printing unit wherein a printer is employed as the chassis for the electronic circuit boards for the system. Novel circuit board structures are provided with sensing units and other components positioned to cooperate with printer components, and these circuit board structures are uniquely combined with the printer to form an operative module.

Additional objects, advantages and features of the invention will be more readily apparent from the following detailed description of a preferred embodiment of the invention when taken together with the accompanying drawings.

BRIEF DESCRIPTION OF THE DRAWINGS

FIG. 5 is a view in front elevation of the moving dot matrix printer employed with the modular electronic measuring and printing unit of FIG. 1;

FIG. 6 is a sectional view of the moving dot matrix printer of FIG. 5 taken along lines 6—6 of FIG. 5;

FIG. 7 is a partial view in side elevation of the record medium drive unit for the moving dot matrix printer of FIG. 5;

BEST MODE FOR CARRYING OUT THE INVENTION

Figure 1:
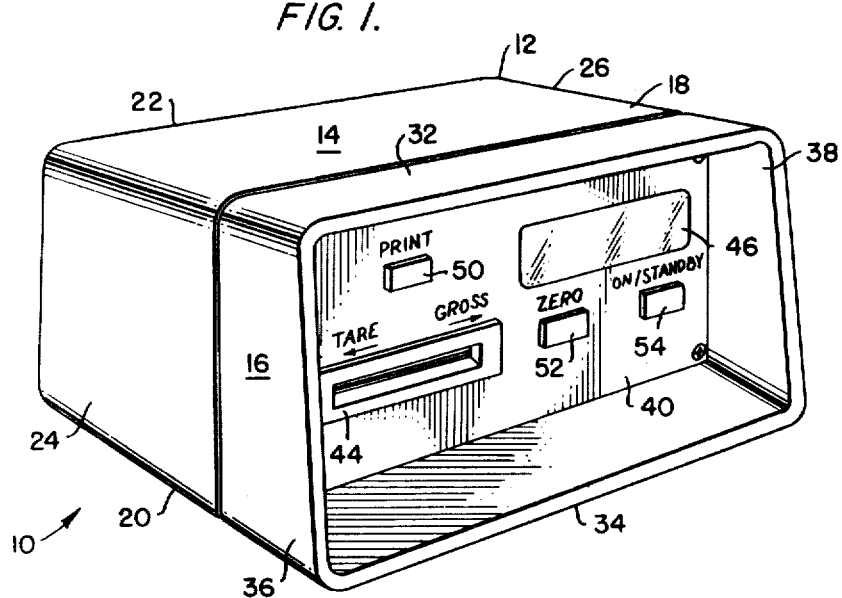
FIG. 1 is a perspective view of the modular electronic measuring and printing unit of the present invention.
Figure 2:
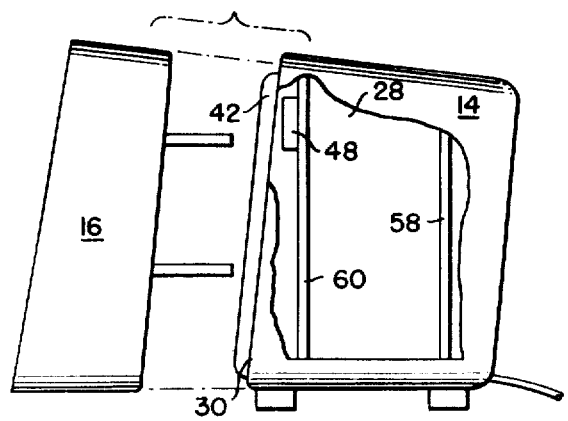
FIG. 2 is a partially cut away side view of the modular electronic measuring and printing unit of FIG. 1 with the first and second sections of the housing assembly separated.
Figure 3:
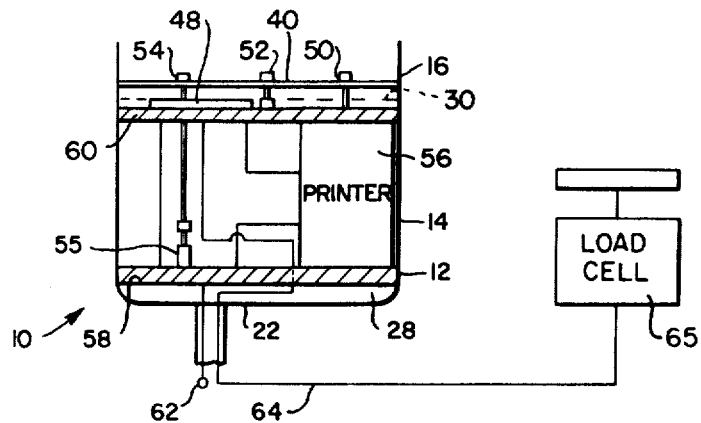
FIG. 3 is a diagrammatic plan view of the interior of the electronic measuring and printing unit of FIG. 1.

Referring now to FIGS. 1-3, the modular, portable, electronic measuring system and printing unit of the present invention indicated generally at 10 includes a housing 12 which is formed from a first housing assembly 14 and a second housing assembly 16. The housing assembly 14 includes a top wall 18, a bottom wall 20, a rear wall 22, and side walls 24 and 26, preferably formed as a unitary unit which defines an enclosure 28 having an open front side 30.

The second housing assembly 16 is adapted to be removably secured to the first housing assembly and operates to close the open front side 30 of the enclosure 28. This second housing assembly is formed by a top wall 32, a bottom wall 34, and side walls 36 and 38, all of which are connected together and substantially coextensive with the top, bottom and side walls of the first housing assembly 14 when the two housing assemblies are connected together. The top, bottom, and side walls of the second housing assembly provide a frame for a recessed face plate 40 which closes the open front side of the enclosure 28 when the second housing assembly 16 is secured to the first housing assembly 14. This may be accomplished by means of an indented, projecting flange 42 which extends from the front edge of the top, bottom, and side walls of the first housing assembly 14 and which is adapted to slide within the open rear side of the second housing assembly 16 to engage the inner surface of the walls thereof.

The face plate 40 includes an elongated slot 44 which receives a ticket or other record medium and a window 46 which is postioned to permit visual observation of a digital display indicator 48 mounted within the enclosure 28. Also mounted upon the face plate 40 are a print button 50, a zero button 52 and a power on/standby button 54 which cooperates with a power switch 55. These buttons may be depressed relative to the face plate 40, but are permanently mounted upon the face plate and are removable from the first housing assembly 14 with the second housing assembly 16.

FIG. 3 provides a diagrammatic illustration of the arrangement of components within the enclosure 28. This arrangement is quite significant, for it not only contributes to the compactness of the unit 10, but also facilitates simple and economic maintenance. It will be noted from FIG. 3, that a printer unit 56 is mounted within the enclosure so as to be in alignment with the slot 44 and operable by the print button 50. Also occupying the enclosure with the printer unit are a power supply circuit board 58 and a measuring and indicator circuit board 60. These two circuit boards are mounted on the printer unit 56 to form a subassembly that is completely functional when removed from the enclosure 28 and which may be conveniently replaced as a single unit. It is important to note that the power supply circuit board is positioned adjacent the rear wall 22 of the enclosure while the measuring and indicator circuit board 60 is positioned adjacent the open front side 30 of the enclosure and thus adjacent to the faceplate 40. Since the measuring and indicator circuit board carries the measuring circuit, the microprocessor unit, calibration adjustments, and the indicator unit for the system, the position of this board makes calibration simpler. Consequently, when the second housing assembly 16 is removed from the first housing assembly 14, the calibration controls and indicator are then readily accessible for convenient calibration.

With the power supply circuit board 58 arranged adjacent the rear wall 22, convenient access for the input power line to the housing 12 is provided. This input power line will carry a power supply conductor 62 directly to the power supply circuit board 58; the short path thereby minimizing possible interference cause by the power supply conductor. A measuring signal conductor 64, which provides an electrical signal from a suitable measuring transducer to the measuring and indicator circuit board 60 may be routed through a separate entry for isolation from the power supply conductor. The conductor 64 might provide an electrical measurement signal from a load cell unit 65 when the modular portable electronic measuring and printer unit 10 is employed for weighing applications. The rearward positioning of the power supply circuit board 58 within the enclosure 28 provides convenient access to this board for the input power line 62 while also enabling this board to conveniently supply power to the printer 56 and the measuring and indicator circuit board 60. Also, since the power supply circuit board requires no adjustment, it need not be as accessible as the measuring and indicator circuit board 60.

Figure 4:
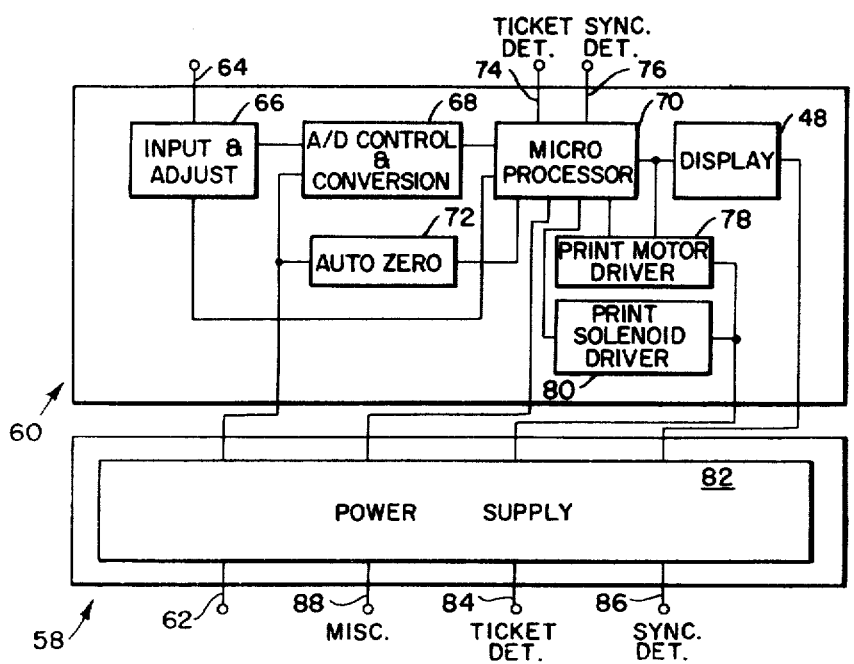
FIG. 4 is a block diagram of the power supply circuit and circuit for the electronic measuring and indicator system for the modular electronic measuring and printing unit of FIG. 1.

With reference to FIG. 4, it will be noted that the measuring and indicator circuit board 60 receives the input measurement signal on the line 64 at an analog input and adjust circuit 66. This circuit may constitute any input circuit for providing low drift amplification while permitting some analog adjustments to the incoming measurement signal. For example, in an electronic weighing system, this adjustment circuit might include the conventional operational amplifiers, comparators, span adjust circuitry, over capacity adjust circuitry, and dead load adjust circuitry. From the adjust circuit 66, the adjusted measurement signal is fed to an analog to digital control and conversion circuit 68 where the input analog measurement signal is converted into a digital signal for processing in a microprocessor 70. The analog to digital control and conversion circuit contains the circuitry necessary to accomplish a digital conversion and is locked into the microprocessor clock to ensure synchronization.

An auto zero adjust circuit 72, which may be activated by the control button 52, is connected to the microprocessor 70 which provides conventional automatic zero tracking and push button zeroing of the system. The microprocessor then controls the digital display provided by the visual display unit 48.

To this point, the components of the electronic measuring and display system contained on the circuit board 60 perform a measurement and display function is a conventional manner which is well known to the prior art. However, the microprocessor 70 is also programmed to control the operation of the printer 56, and to accomplish this function, the microprocessor receives an input from a ticket insertion detector on an input line 74 and a second input from a synchronization detector on an input line 76. The microprocessor provides control signals to a print motor driver 78 and also to a print solenoid driver 80.

The power supply circuit board includes a power supply circuit 82 to provide power to both the components on the measuring and indicator circuit board 60 as well as to components for the printer 56. For example, the power supply circuit provides power on a ticket detector output line 84 and also on a synchronization detector output line 86. Additionally, power is supplied to other miscellaneous components of the system on a miscellaneous line 88. For example, the line 88 could provide power to an optional heater for the modular electronic measuring and printing unit 10.

The strucure of the moving dot matrix ticket printer 56 may best be understood with reference to FIGS. 5–7 and 12. The frame for the printer is formed by two vertically extending side plates 90 and 92 which are spaced apart by upper spacing bars 94 and lower spacing bars 96 secured to the side plates. Mounted on the exterior of the side plate 90 is a stepper motor 98 having an output shaft 100 which extends through the side plate and is mounted for rotation relative thereto. Secured to the stepper motor output shaft is a drive gear assembly 102 which includes a drive gear 104 and a position sensing flange 106. This drive gear 104 meshes in driving relation with a driven gear 108 which is secured to a main drive shaft 110. This main drive shaft extends between the side plates 90 and 92, and the two respective ends of the main drive shaft are mounted for rotation on the side plates. Thus the main drive shaft is rotated by the driven gear 108 and the drive gear 104 under the control of the stepper motor 98, and this results in the rotation of a cam disc 112. The cam disc is secured to the driven gear 108 for rotation therewith and includes an inclined cam face 114.

A solenoid operated printer assembly 116 is mounted for reciprocal movement along the main drive shaft 110. This printer assembly includes a carriage 118 having a shaft receiving opening 120 extending transversely through the bottom section thereof to receive the shaft 110. The shaft receiving opening is of sufficient size to permit the carriage 118 to slide freely back and forth along the shaft 110.

The carriage 118 is U-shaped in configuration and supports a print solenoid 122 between the legs of the U. This print solenoid is mounted upon the carriage by means of a bracket 124 secured to the carriage, and the bracket is provided with suitable apertures to permit a printing pin or other printing member operated by the print solenoid to extend downwardly and engage a record sheet passing beneath the solenoid operated printer assembly.

Figure 12:
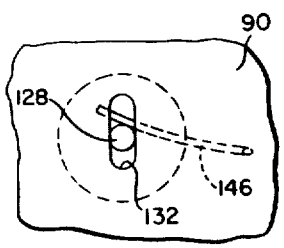
FIG. 12 is a partial view in side elevation of the pinch roller shaft mounting of FIG. 5.

The lower leg of the U-shaped carriage 118 is provided with a transverse aperture 126 to receive a shaft 128 for spaced pinch rollers 130. This shaft is mounted for upward movement in vertically inclined slots 132 and 134 in the side plates 90 and 92 (FIG. 12). Thus, when the print carriage 118 is pivoted about the main drive shaft 110, the shaft 128 and the pinch rollers 130 carried thereby are also pivoted about the main drive shaft due to the extension of the shaft 128 through the aperture 126 and the upward movement of the ends of the shaft in the slots 132 and 134.

The pinch rollers 130 normally contact a print drive roller 136 which extends between the side plates 90 and 92 and which is mounted for rotation relative thereto. A record medium to be printed by the solenoid operated printer is inserted between the print roller 136 and the pinch rollers 130. To accomplish this record medium insertion, the front surface of the upper leg for the U-shaped carriage 118 is formed to provide a flat area 138 which is contacted by a mechanical extension rod indicated at 140 on the print button 50 when the print button is depressed. This causes the carriage 118 to pivot about the main drive shaft 110, thereby pivoting the shaft 128 and raising the pinch rollers 130 above and away from contact with the print drive roller 136. This will permit a record medium to be inserted between the print drive roller and the pinch rollers and into a suitable guide 142 extending between the side plate 90 and 92.

When the record medium contacts a stop formed by the end 144 of the guide unit 142 or, when no guide unit is provided, the face of the power supply circuit board 58, the print button 50 may be released to initiate operation of the printer 56. Release of the button permits the carriage 118 to pivot back about the main drive shaft 110 until the pinch rollers 130 are again in contact with the print drive roller 136. To insure that this return movement occurs and to bias the pinch rollers into engagement with the print drive roller, bail springs 146 are connected between the side plates 90 and 92 respectively and the ends of the shaft 138. The bail springs are connected to draw the shaft 128 downwardly in the slots 132 and 134 toward the print drive roller.

The print drive roller 136 is driven by the main drive shaft 110 through a drive gear 148 which is mounted on an end of the print drive roller shaft that extends through the side plate 92. The drive gear 148 is in turn driven by an end of the main drive shaft 110 which extends through the side plate 92 and engages the drive gear. This end of the main drive shaft is flattened to provide a flat sided blade 150 similar in form to a screw driver blade. As will be noted in FIG. 7, this flat sided blade engages the teeth of the drive gear 148 to move the gear as the main drive shaft 110 rotates. The blade cooperates with an index spring 152 mounted upon the side plate 92 to move the drive gear 148 to a position where it is held by the index spring.

When the stepper motor 98 drives the main drive shaft 110, the blade 150 causes controlled rotation of the print drive roller 136, while the cam 112 positions the printer assembly 116 longitudinally along the main drive shaft. This is accomplished by a cam follower 154 which engages the cam face 114 of the cam 112 to cause lateral movement of the printer assembly, and a spring 156 mounted on the drive shaft 110 biases the printer assembly to the left in FIG. 5 so that the cam follower is maintained in contact with the cam face. As the cam 112 causes the printer assembly 116 to move to the right in FIG. 5, the spring 156 is compressed. It will be noted that the pinch rollers 130 are spaced apart for a distance sufficient to permit full lateral movement of the printer assembly to the extent provided by the cam face 114.

Figure 8:
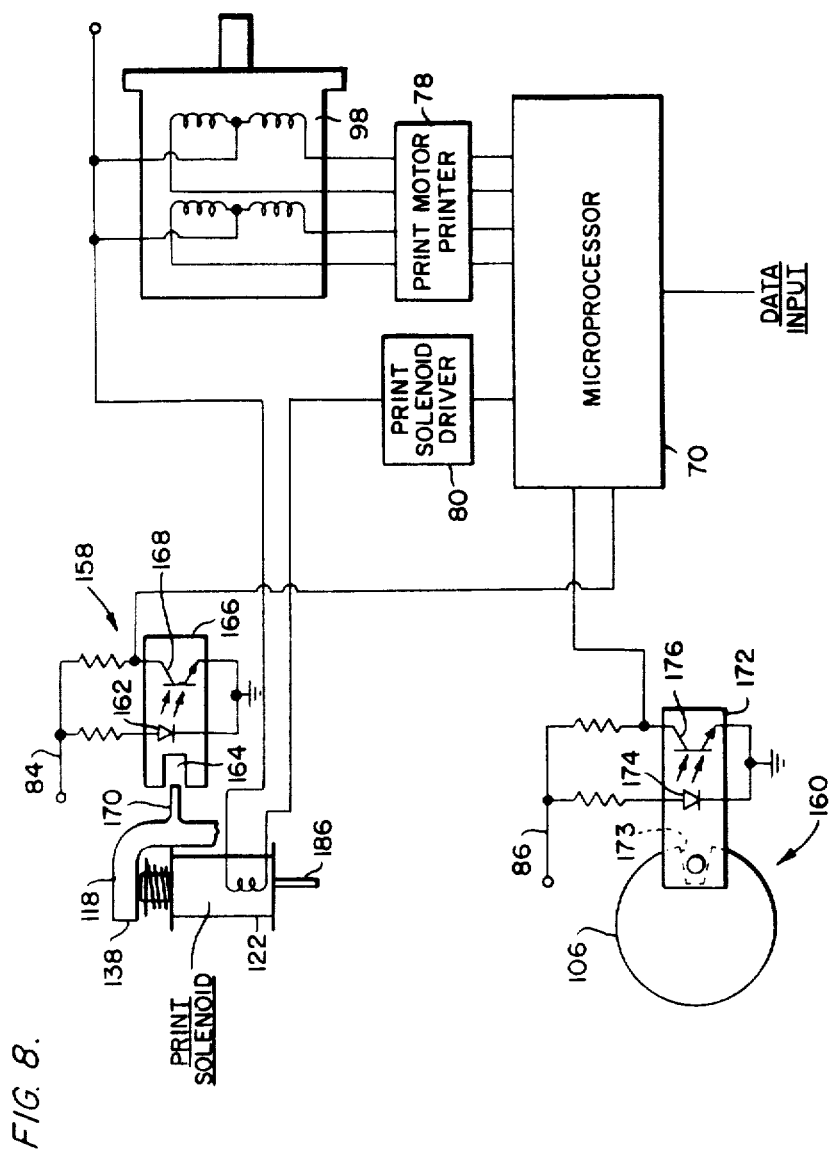
FIG. 8 is a block diagram of the electronic circuit for the moving dot matrix printer of FIG. 5.

The control circuit for the moving dot matrix printer 56 may best be understood with reference to FIG. 8. Here, it will be noted that the printer timing and character generation functions are controlled by a microprocessor, which may be the same microprocessor 70 employed with the measuring circuit on the measuring circuit and indicator card 60. This microprocessor may constitute an 8048 or 8748 single chip microprocessor manufactured by Intel Corporation and programmed for both measurement and print control functions. On the other hand, the microprocessor for the printer 56 may be a self contained microprocessor constituting a portion of the printer proper, and in this case the microprocessor might receive data at a data input from a measuring circuit microprocessor such as the microprocessor 70 or from some other data source. In instances where the main measuring unit microprocessor is not employed in the printer and the printer is provided with a self contained microprocessor, the printer microprocessor could still constitute a single chip microprocessor having character matrix dot patterns stored in a non volatile memory. Otherwise the measuring circuit microprocessor is programmed and designed to control the printer 56.

Before the microprocessor initiates character printing, it must first determine whether a ticket or other record medium has been inserted into the printer 56 through the slot 44, and it must also determine whether or not the cam 112 is in the proper starting position. This information is provided to the microprocessor by a ticket insertion detector 158 and a synchronization detector 160. The ticket insertion detector 158 includes a light source, such as a light emitting diode 162, which transmits light across a slot 164 in a sensing block 166 to a light sensitive transistor or similar solid state device 168. The sensing block is mounted on the power supply circuit board 58 in such a manner that the slot 164 is positioned behind the carriage 118 and is directly aligned with a blade 170 extending from the rear side of the carriage. When the carriage is tilted about the main drive shaft 110 by the push button 50 to accomplish the insertion and positioning of a record medium below the solenoid operated printer assembly 116, the blade 170 enters the slot 164 and prevents light from the light emitting diode 162 from reaching the light sensitive transsitor 168. This provides a ticket insertion signal on the line 74 to the microprocessor 70.

Similarly, the synchronization detector 160 includes a sensing block 172 which is suitably mounted upon the power supply circuit board 58 to sense the position of the cam 112. This may be done by either sensing the position of a notch provided in a flange directly on the cam 112, or, as in the case of the unit of FIG. 5, by sensing the position of a notch 173 cut in the flange 106. The synchronization detector includes a light emitting element, such as a light emitting diode 174, positioned by the sensing block 172 on one side of a slot 175 which receives the flange 106, and a light sensitive transistor 176 positioned by the sensing block on the opposite side of the flange 106. With the slot 173 and therefore the cam 112 in the proper starting position, the light from the light emitting diode 174 will strike the transistor 176 and provide a proper position signal on the line 76 to the microprocessor 70.

Figure 9:
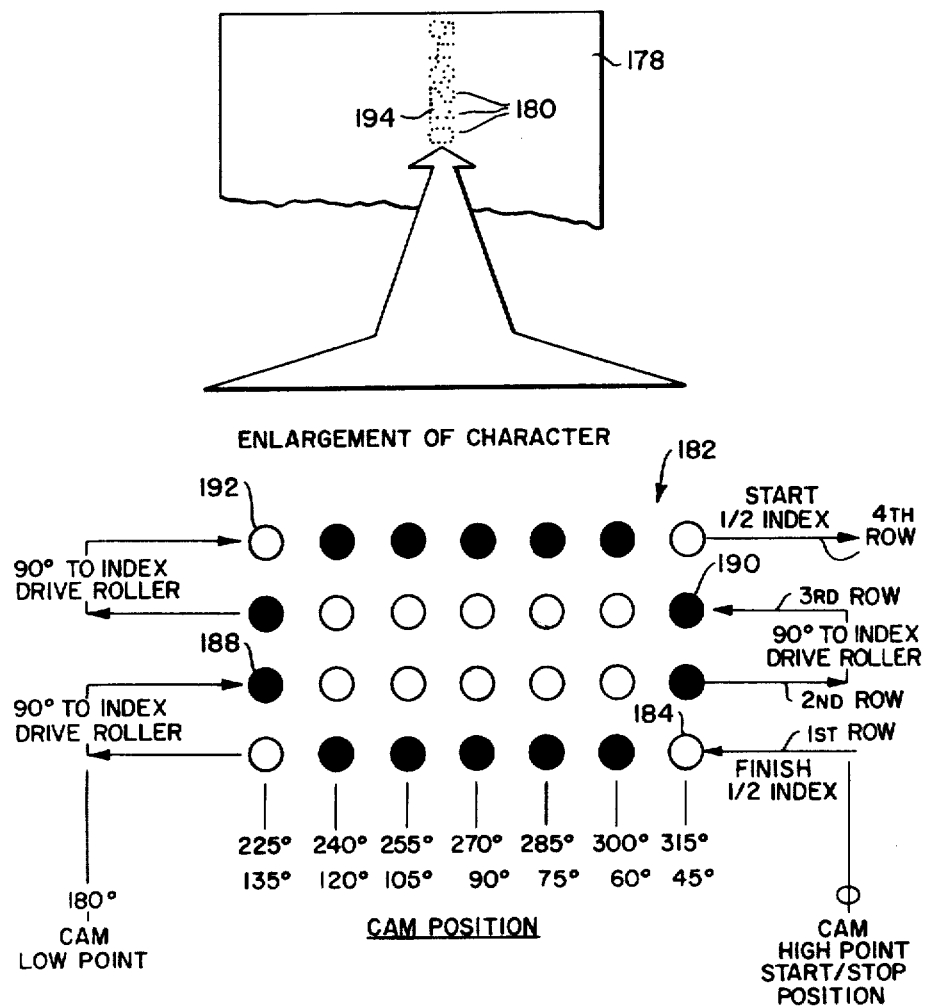
FIG. 9 is a diagram disclosing the mode of operation of the moving dot matrix printer of FIG. 5.

As illustrated in FIG. 9, the moving dot matrix printer 56 operates to print a character within a dot matrix on the record medium illustrated at 178. In FIG. 9, each character 180 formed on the record medium is formed within a seven by four dot matrix 182. For simplicity, the seven by four dot matrix has been used for illustration but obviously larger dot matrices can be formed in the same manner by programming the microprocessor 70 to add additional dot rows.

Similarly, the slope of the cam face 114 determines the character height, while the character width is determined by the diameter of the drive gear 148 and the drive roller 136. These parameters can be changed to vary both the height and the width of the character formed within any specific dot matrix.

To activate the printer 56, the print button 52 is depressed to rotate the carriage 118 about the main drive shaft 110, and a ticket or other record medium is inserted until it engages the stop 144. When the print button is then released, the blade 170 leaves the slot 164 and a signal is sent to the microprocessor 70 to indicate that a ticket is in a position for printing. When the microprocessor program recognizes that a ticket has been inserted, that input data has been stored, and that the high point of the cam surface 114 is in the proper start position, printing will begin. If, however, the cam 112 is not in the proper start position so that the notch 173 is not aligned with the light emitting diode 174, the microprocessor will cause the stepper motor 98 to rotate the main drive shaft 110 until the cam is in the proper start position and a start signal is received from the synchronization detector 160.

Once the cam 112 is in the proper start position, and the print button 52 has been released, printing automatically begins. The printer assembly 116 is first linearly deflected along the main drive shaft 110 from right to left in FIG. 5 by the rotation of the cam 112 and is then returned back from left to right as the cam continues to rotate. The direction of movement reverses during each half revolution of the cam, and during the middle 90° of each half revolution, the vertical dots required for each row to form the character are marked. The other 90° of motion, symmetrical about the cam high and low points, is used to drive the ticket to the correct row position to provide good character form.

The stepper motor 98 rotates the cam 7½° per step starting from the high point of the cam which is top dead center. The cam translates angular into a linear displacement causing the printer assembly 116 to move 0.01 inches per step. To form the first row of dots indicated at 184, the cam follower 154 moves down the cam surface to impart the initial right to left movement of the printer assembly. During the first 45° of cam displacement, the blade 150 engages the gear 148 and causes the drive roller 136 to index the record medium at an initial print position beneath the printer assembly 116. At this point, the blade 150 is rotated to a point where it is completely disengaged from the teeth of the gear 148 and, at this 45° point of the cam, the microprocessor 70 makes the first dot print decision. With the blade 150 remaining in the disengaged position relative to the drive gear 148 and the index spring 152 between the teeth of the drive gear to maintain positive positioning of the record medium, the stepper motor 98 continues to step the cam 112. For each 15° of cam rotation which constitutes a 0.02 inch displacement of the printer 116, the microprocessor 70 makes a determination as to whether a dot is to be printed. If a dot is to be printed, the microprocessor operates through the print solenoid driver 80 to energize the print solenoid 122. This causes a solenoid driven dot marker 186 to provide a dot on the record medium. The dot marker may constitute any unit for making a single dot impression on either plain or specially treated record paper by thermal, impact, light, or electric current application.

Once the cam 112 has been stepped from the 45° point to the 135° point, and a total of seven potential dot decisions have been made for the line 184, the cam will have reached the end of the first line. During the next 90° of rotation of the cam from the 135° point to the 225° point, the low point on the cam is passed and the blade 150 reengages the drive gear 148 and indexes the drive roller 136 so that the record medium is driven outwardly to bring the record medium into line for the formation of the second row of dots indicated at 188. For purposes of illustration, the gear 148 is indexed for one tooth or 0.02 inches, again leaving the index spring 152 positioned between the gear teeth to insure correct positioning for the row of dots 188.

After the cam low point at 180° of rotation has passed, the cam reverses the direction of travel of the printer assembly 116 so that the printer now moves from left to right in FIG. 5. Before the 225° point on the cam, the blade 150 has moved out of contact with the drive gear 148, and again the printer assembly moves across the record medium with a print decision being made every 15°. After the cam has traversed 90° to the 315° point, the second row of dots is completed and during the next 90° of rotation of the cam from the 315° point to the 45° point, the drive roller 136 is again indexed to move the record medium outwardly. During this indexing from 315° to 45°, the cam 0° or high point is passed, and the direction of movement of the printer assembly 116 is again reversed so that the printer assembly again moves from right to left in FIG. 5. Now the complete process described in connection with lines 184 and 188 is reinstituted to complete lines 190 and 192.

When the cam 112 reaches the 315° position completing the fourth row 192 in FIG. 9, the cam will return to top dead center in the final 45° of travel. During this final 45°, the blade 150 again engages the drive gear 148 and a one half index of the drive gear occurs. However, once the cam reaches the top dead center position and the seven by four dot matrix 182 is completed, the microprocessor 70 causes the stepper motor 98 to rotate the drive shaft 110 to complete one full cycle of revolution of the cam without activation of the print solenoid 122. This causes the blade 150 and drive gear 148 to move the drive roller 136 through two index positions to either create a space shown at 194 between the characters imprinted upon the record medium 178 or, if the final character has been printed, to eject the record medium from between the pinch roller 130 and the drive roller 136 so that the record medium may be withdrawn from the slot 44.

As previously indicated, the size of the matrix 182 can be altered by altering the program of the microprocessor 70. For example, a five instead of a four line matrix can be formed by having the printer print an additional line. Also, nine instead of seven dots can be included in a line by adding dot decision points at 30°, 150°, 210°, and 330° of the cam. Although the stepper motor 98 having a step angle of 7½° was found to be efficient, any motor step angle can be accommodated by adjusting the slope of the cam 112 to maintain dot spacing and character height. The character form is determined by a code tabulation stored in the non volatile memory of the microprocessor and addressed by the input data character to be printed. The microprocessor program compensates for the alternate right to left and then left to right dot row printing by feeding the print solenoid driver 80 from alternate ends of an internal microprocessor register.

The moving dot matrix ticket printer 56 forms a chasis for the power supply circuit board 58 and the measuring and indicator circuit board 60, and combines with these two circuit boards to form a completely operative measuring and printing module separate from the housing 12. No structure contained upon the housing 12 is required to accomplish operation of the measuring and printing module formed by the printer 56 and the boards 58 and 60, and this module may be removed from the housing 12 and still be completely operable.

Figure 10:
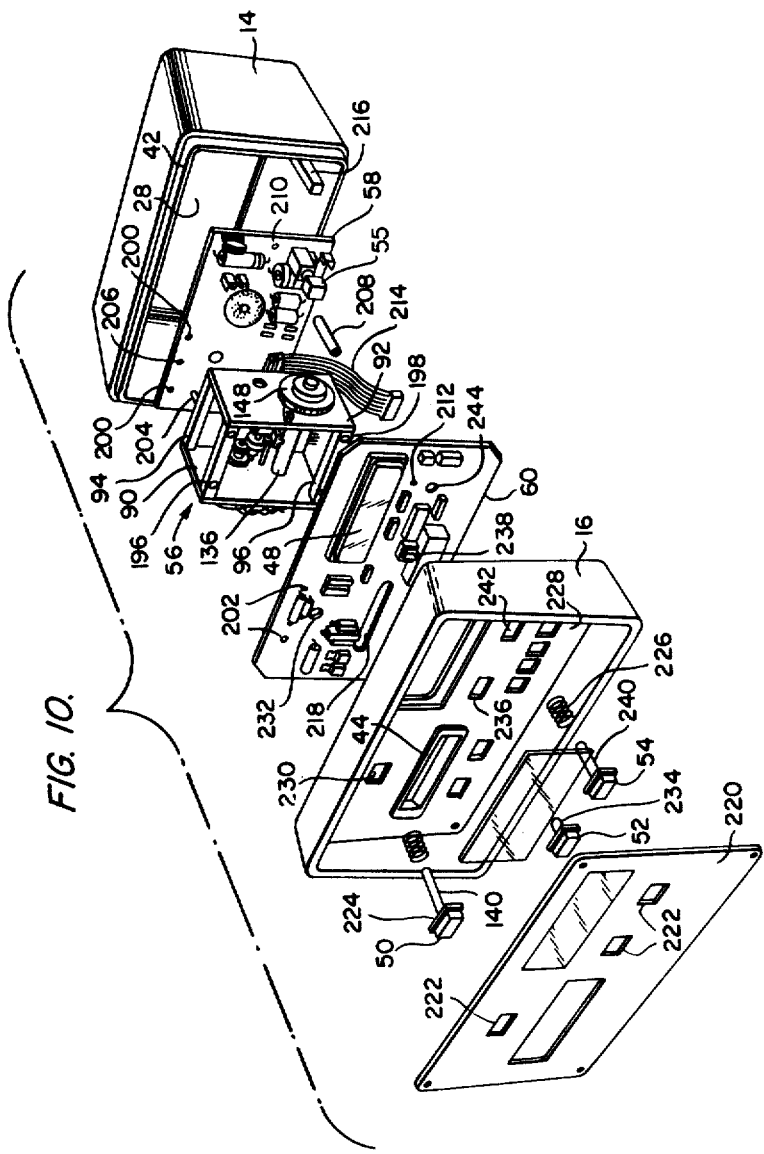
FIG. 10 is an exploded view of the electronic measuring and printing unit of the present invention.
Figure 11:
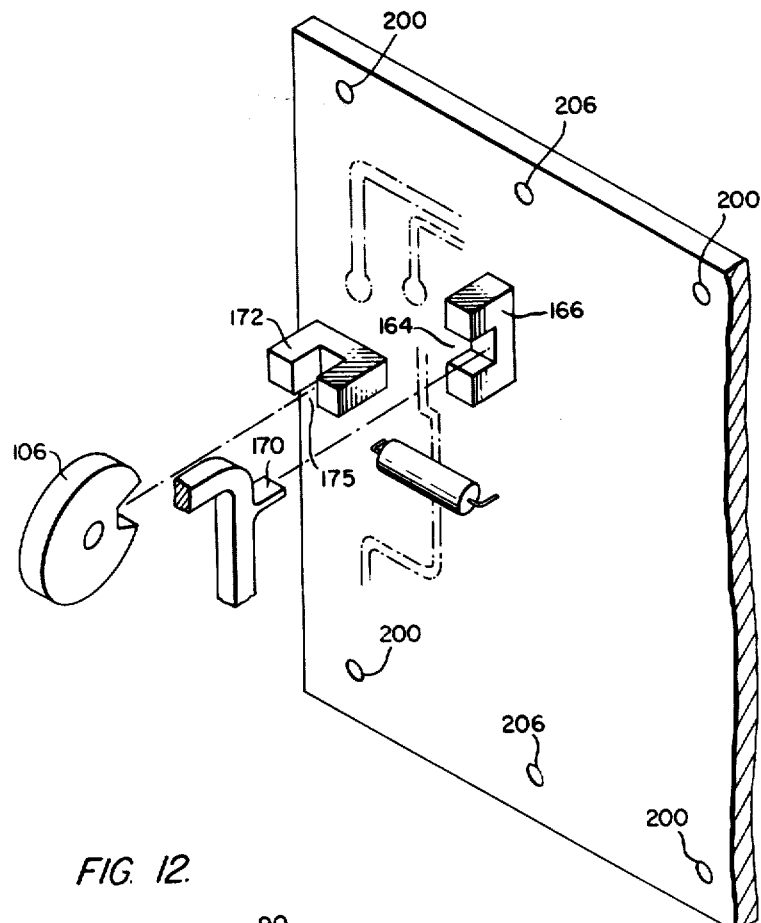
FIG. 11 is an exploded section of the power circuit board of FIG. 10 in combination with the detectors of FIG. 8.

Referring to FIG. 10, it will be noted that the spacing bars 94 and 96 which extend between the side plates 90 and 92 of the moving dot matrix ticket printer are provided respectively with outwardly facing threaded apertures 196 and 198 that are adapted to align with holes 200 and 202 formed in the power circuit board 58 and the measuring and indicator circuit board 60 respectively. Threaded screws or other suitable fasteners may then be inserted through the holes 200 and 202 and threaded into the apertures 196 and 198 to attach the circuit boards 58 and 60 to the printer 56. It is imperative that the power circuit board be carefully aligned with the printer, as the power circuit board carries the sensing blocks 166 and 172 (FIG. 11). Since the slot 164 in the sensing block 166 must be aligned with the blade 170 on the carriage 118 while the slot 175 in the sensing block 172 must be aligned to receive the flange 106, the power circuit board 58 must be carefully positioned with respect to the printer 56. To achieve this position, the upper and lower spacing bars 94 and 96 which engage the power circuit board 58 are each provided with rearwardly projecting locator pins 204 which project into locator holes 206 provided in the power circuit board between the holes 200. This insures alignment of the power circuit board and the sensing blocks 166 and 172 with corresponding components of the printer.

After the power circuit board 58 and the measuring and indicator circuit board 60 are secured to the printer 56, a tubular spacer 208 having a threaded aperture at each end may be positioned between the free ends of the power circuit board and the measuring and indicator circuit board in alignment with holes 210 and 212 therein. This spacer may then be secured by threaded screws or other fasteners inserted through the holes 210 and 212 and into the spacers, thereby creating a very rigid assembly. Now a flat belt type connector 214 which is secured to the power circuit board 58 may be passed beneath the printer 56 and secured to a proper socket (not shown, on the measuring and indicator circuit board 60 to complete the power and other connections thereto.

The operational module formed by the printer 56, the power circuit board 58, and the measuring and indicator circuit board 60 may easily be inserted within the enclosure 28 in the first housing assembly 14 and is positioned and supported therein by locator bars 216 formed in the first housing assembly. It will now become apparent that when the second housing assembly 16 is secured to the first housing assembly, the slot 44 will align with a slot 218 in the measuring and indicator circuit board 60 which in turn is aligned with the juncture between the drive roller 136 and the pinch rollers 130. Thus, a ticket inserted through the slot 44 will pass through the slot 218 and between the pinch rollers 130 and drive roller 136 until the ticket engages either the stop 144 or, in the absence of such stop, engages the power circuit board 58.

As previously stated, the print button 50, zero button 52, and power on/standby button 54 are removed from the first housing assembly 14 with the second housing assembly 16. One method for accomplishing this may be to provide the second housing assembly with a face plate 220 provided with apertures 222 which are dimensioned to permit only a portion of the buttons 50, 52 and 54 to project therethrough. Each of these buttons may be provided with a flange 224 which contacts the face plate 220 and limits the outward projection of the buttons through the apertures 222. Biasing springs 226 for biasing these buttons outwardly may be retained between the face plate 220 and a rear wall 228 on the second housing assembly which cooperates with the face plate to form the recessed face plate 40. The face plate 220 and rear wall 228 are arranged to permit limited inward movement of the buttons 50, 52 and 54.

It has previously been indicated that the print button 50 includes an extension rod 140 which operates, when the print button is depressed, to contact the flat area 138 on the printer carriage 118. This extension rod extends through an aperture 230 in the rear wall 228 and an aperture 232 in the measuring and indicator circuit board 60 to reach the printer 56.

Similarly, the zero button 52 is provided with a short extension rod 234 whcih extends through an aperture 236 in the rear wall 228 and which contacts a zero control button 238 on the measuring and indicator circuit board.

Finally, the power on/standby button 54 is provided with an extension rod 240 which extends through an aperture 242 in the rear wall 228 and an aperture 244 in the measuring and indicator circuit board 60 to the power switch 55 mounted upon the power circuit board 58.

To achieve effective operation of the modular, portable, electronic measuring system and printing unit 10 in the manner described, the single chip microprocessor 70 may be programmed in accordance with the program disclosed in our U.S. Pat. No. 4,393,455. If the moving dot matrix ticket printer 56 includes a self contained microprocessor 70 and is employed as a separte unit, this microprocessor program would then begin at line 776 of this program.

When the moving dot matrix printer 56 is combined in the modular system 10 of FIG. 1, an extremely compact and efficient measuring and printing unit is provided. Other aspects and advantages of the present invention will be readily apparent from a consideration of the specification and the appended drawings.

We claim:

1. A modular, portable assembly for an electronic measuring unit comprising a housing having top and bottom walls, front and rear walls and two sidewalls connected to form an enclosure, power supply means mounted within said enclosure and including a power supply circuit card mounted adjacent the rear wall of said housing, measuring circuit means mounted within said enclosure and including a measuring circuit card mounted between said front wall and said power supply circuit card, said measuring circuit card including indicator means mounted upon a side thereof facing said front wall, said front wall being provided with window means positioned to permit visual observation of said indicator means through said front wall, and electrical conductor means extending through said housing into said enclosure and connected to provide an electrical signal indicative of an entity to be measured to said measuring circuit means, said front wall being removable to provide access to said enclosure.

2. The modular portable assembly for an electronic measuring unit of claim 1, wherein said housing includes a first assembly having top and bottom walls, a rear wall and two side walls interconnected to form an enclosure with an open front side, said power supply means and measuring circuit means being mounted within the enclosure of said first assembly, and a second assembly including said front wall removably connected to said first assembly to close the open front side of said enclosure.

3. A modular, portable assembly for an electronic measuring unit comprising a housing having top and bottom walls, front and rear walls and two sidewalls connected to form an enclosure, said housing being formed by a first assembly having top and bottom walls, a rear wall and two side walls interconnected to form a first enclosure with an open front side, and a second assembly including said front wall and removably connected to said first assembly to close the open front side of said first enclosure, power supply means mounted within said first enclosure and including a power supply circuit card mounted adjacent the rear wall of said first enclosure, measuring circuit means mounted within said first enclosure and including a measuring circuit card mounted between said open front side and said power supply circuit card, said measuring circuit card having circuit control elements mounted thereon, electrical conductor means extending through said housing into said first enclosure and connected to provide an electrical signal indicative of an entity to be measured to said measuring circuit means, and manual control means mounted upon said front wall, said manual control means being operable to contact elements on said measuring circuit card when said second assembly is connected to said first assembly, the manual control means being removable from said first assembly with said second assembly.

4. An electronic measuring and printing unit comprising electrical measuring means operative to provide an output signal indicative of the magnitude of an entity being measured thereby, a single chip microprocessor means connected to receive said output signal and register an indication in response thereto, and a moving dot matrix printer for forming alpha and numeric characters on a record medium in accordance with the indication registered by said single chip microprocessor means, said moving dot matrix printer including a support means, record medium drive means mounted upon said support means to receive and position a record medium, said record medium drive means operating during the formation of a character to move said record medium in a first plane, printer assembly means including print means mounted upon said support means and operative to mark said record medium, said printer assembly means including position control means to cause relative movement between said print means and said record medium in a second plane transverse to said first plane during the formation of a character, said single chip microprocessor means being connected to control the operation of said printer assembly means in accordance with the indication registered thereby.

5. The electronic measuring and printing unit of claim 4, wherein said electrical measuring means includes load cell means for providing an analog signal indicative of a weight applied thereto, and analog to digital conversion means connected to receive said analog signal and operative to provide a digital output signal to said single chip microprocessor means.

6. The electronic measuring and printing unit of claim 5, which includes indicator means connected to said single chip microprocessor means, said indicator means operating to provide a visual digital display indicative of the digital output signal received by said single chip microprocessor.

7. An electronic measuring and printing module comprising a moving dot matrix printer for forming alpha and numeric characters on a record medium, said printer including a support means and print means mounted upon said support means and operative to mark an adjacent record medium, and a circuit board assembly secured to said support means to position components carried by said circuit board assembly for cooperation with components of said printer, said support means operating as a chasis for said circuit board assembly which includes a power circuit board, position sensing means mounted upon one surface of said power circuit board and adapted to sense the position of at least one structural component of said printer when said power circuit board is properly positioned on said printer support means, and mounting and alignment means formed on said power circuit board to facilitate attachment of said power circuit board to said support means, said mounting and alignment means operating to position said position sensing means on said support means to sense the position of said printer structural component.

8. The electronic measuring and printing module of claim 7, wherein said print means is mounted upon said support means for movement in at least a first plane between a start and a stop position, said position sensing means operating to indicate whether said print means is in the start position.

9. The electronic measuring and printing module of claim 8 wherein said printer includes record medium drive means mounted upon said support means and operative to receive and position a record medium relative to said print means, said record medium drive means including hold down means movably mounted upon said support means and adapted for movement to permit reception of a record medium by said record medium drive means, said position sensing means operating to indicate when said hold down means is moved to permit such reception of a record medium.

10. The electronic measuring and printing module of claim 9 wherein said circuit board assembly includes a measuring circuit board mounted upon said support means on a side thereof opposite to said power circuit board, said measuring circuit board including an opening extending therethrough to receive said record medium, said measuring circuit board being mounted on said support means with the opening therein positioned relative to said record medium drive means to cause a record medium passing through said opening to be received by said record medium drive means.

11. The electronic measuring and printing module of claims 7, wherein said printer includes record medium drive means mounted upon said support means and operative to receive and position a record medium relative to said print means, said record medium drive means including hold down means movably mounted upon said support means and adapted for movement to permit reception of a record medium by said record medium drive means, said position sensing means operating to indicate when said hold down means is moved to permit such reception of a record medium.

12. The electronic measuring and printing module of claim 7, wherein said circuit board assembly includes a measuring and indicator circuit board mounted upon said support means on a side thereof opposite to said power circuit board, said measuring and indicator circuit board including an electronic measuring circuit and a visual, digital indicator connected thereto, said power circuit board including means to receive power from an external power source and electrical connector means to connect said power circuit board to said measuring and indicator circuit board.

13. A modular, portable assembly for an electronic measuring unit comprising a housing having top and bottom walls, front and rear walls and two sidewalls connected to form an enclosure, power supply means mounted within said enclosure and including a power supply circuit card mounted adjacent the rear wall of said housing, measuring circuit means mounted within said enclosure and including a measuring circuit card mounted between said front wall and said power supply circuit card and electrical conductor means extending through said housing into said enclosure and connected to provide an electrical signal indicative of an entity to be measured to said measuring circuit means, at least said front wall being removable to provide access to said enclosure, matrix printer means mounted within said enclosure, said matrix printer means being connected to receive data from said measuring circuit means and operative in response to said data to print alpha and numeric characters on a record medium, said front wall being provided with a record medium receiving slot which extends therethrough, said record medium receiving slot being positioned in alignment with said matrix printer means.

14. The modular, portable assembly for an electronic measuring unit of claim 13, wherein said housing includes a first assembly having top and bottom walls, a rear wall and two side walls interconnected to form an enclosure with an open front side, said power supply means, measuring circuit means and matrix printer means being mounted within the enclosure of said first assembly, and a second assembly including said front wall removably connected to said first assembly to close the open front side of said enclosure.

15. The modular portable assembly for an electronic measuring unit of claim 13, wherein manually operated printer activating means are mounted upon said front wall, said printer activating means being manually operable to initiate operation of said matrix printer means, the printer activating means being removable with said front wall.

16. The modular, portable assembly for an electronic, measuring unit of claim 15 wherein said measuring circuit card has circuit control means mounted thereon, and wherein manual control means are mounted upon said front wall, said manual control means being operable to contact control means on said measuring circuit card, the manual control means being removable with said front wall.

17. The modular, portable, assembly for electronic measuring unit of claim 16, wherein said measuring circuit card includes indicator means mounted upon a side thereof facing said front wall, said front wall being provided with window means positioned to permit visual observation of said indicator means through said front wall.

18. A modular, portable assembly for an electronic measuring unit comprising a housing including a first assembly having top and bottom walls, a rear wall and two sidewalls interconnected to form an enclosure with an open front side, and a second assembly including a front wall removably connected to said first assembly to close the open front side of said enclosure, and an electronic measuring and printing module mounted within said enclosure, said electronic measuring and printing module including a power supply circuit card mounted adjacent to said rear wall of the first assembly, a measuring circuit card mounted adjacent to the open front side of said enclosure in spaced relation to said power supply circuit card, a printing means mounted between said power supply and measuring circuit cards, and connector means electrically connecting said power supply circuit card to said measuring circuit card and said measuring circuit card to said printing means.

19. The modular, portable assembly for an electronic measuring unit of claim 18 wherein said measuring circuit card includes circuit control means mounted thereon and wherein manual control means are mounted upon said front wall, said manual control means being operable to activate said circuit control means on said circuit card and to operate said printing means when said second assembly is connected to said first assembly, the manual control means being removable from said first assembly with said second assembly.

20. The modular, portable assembly for an electronic measuring unit of claim 19 wherein a first record medium receiving opening is provided in and extends through said front wall and a second record medium receiving opening is provided in and extends through said measuring circuit card, said printing means including record medium receiving means which is aligned with said first and second record medium receiving openings when said second assembly is connected to said first assembly.

21. The modular, portable assembly for an electronic measuring unit of claim 20 wherein said printing means is a moving dot matrix printer for forming alpha and numeric characters on a record medium received in said record medium receiving means, said printer including a support means and print means mounted upon said support means and operative to mark a record medium, said power supply circuit and measuring circuit cards being secured to said support means to position components carried by said power supply circuit card for cooperation with components of said printer and the circuit control means carried by said measuring circuit card with said manual control means, position sensing means mounted upon one surface of said power circuit card and adapted to sense the position of at least one structural component of said printer when said power circuit card is properly positioned on said printer support means, and mounting said alignment means formed on said power circuit card to facilitate attachment of said power circuit card to said support means, said mounting and alignment means operating to position said position sensing means to sense the position of said printer structural component.

22. The modular, portable assembly for an electronic measuring unit of claim 18 wherein said printing means includes a position indicating component, said power supply circuit card including a body for mounting electrical components, position sensing means mounted upon one surface of said body and adapted to sense the position of the position indicating component of said printing means.

23. The modular, portable assembly for an electronic measuring unit of claim 22 wherein said position sensing means includes a sensing block projecting from said body, a slot for receiving said position indicating component formed in said sensing block and dividing said sensing block into first and second sections, a sensing signal transmitting means mounted in said first section for transmitting a sensing signal across said slot and a sensing signal receiving means mounted in said second section for receiving said sensing signal.

24. The modular, portable assembly for an electronic measuring unit of claim 23 wherein said measuring circuit card includes circuit control means mounted thereon and wherein manual control means are mounted upon said front wall, said manual control means being operable to activate said circuit control means on said circuit card and to operate said printing means when said second assembly is connected to said first assembly, the manual control means being removable from said first assembly with said second assembly.

25. The modular, portable assembly for an electronic measuring unit of claim 24 wherein a first record medium receiving opening is provided in and extends through said front wall and a second record medium receiving opening is provided in and extends through said measuring circuit card, said printing means including record medium receiving means which is aligned with said first and second record medium receiving openings when said second assembly is connected to said first assembly.

26. An electronic measuring and printing unit comprising electrical measuring means operative to provide an output signal indicative of the magnitude of an entity being measured thereby, a microprocessor means connected to receive said output signal and register an indication in response thereto, a moving dot matrix printer for forming alpha and numeric characters on a record medium under the control of said microprocessor means and in accordance with the indication registered thereby, said moving dot matrix printer including a support means, record medium drive means mounted upon said support means to receive and position a record medium, print means mounted upon said support means and operative to mark said record medium, position control means connected to said microprocessor means and operative under the control of said microprocessor means to cause relative movement between said print means and said record medium in a first plane between a start and a stop position, and synchronization detector means operative to sense the position of said print means connected to said microprocessor means, said synchronization detector means operating to provide an indication signal to said microprocessor means when said print means is in the start position.

27. The electronic measuring and printing unit of claim 26 which includes ticket detector means connected to said microprocessor means, said record medium drive means including hold down means movably mounted upon said support means and adapted for movement to permit reception of a record medium by said record medium drive means, said ticket detector means operating to provide a detection signal to said microprocessor when said hold down means is moved to permit such reception of a record medium.

28. The electronic measuring and printing unit of claim 27 wherein said microprocessor means includes a single chip microprocessor.

* * * * *